US009241055B1

(12) United States Patent
Barker (10) Patent No.: US 9,241,055 B1
(45) Date of Patent: Jan. 19, 2016

(54) TWO-WAY PASSIVE ACOUSTIC CONCENTRATOR FOR A MOBILE PHONE

(71) Applicant: Nicholas Barker Design LLC, Laguna Beach, CA (US)

(72) Inventor: Nicholas Evan Barker, Laguna Beach, CA (US)

(73) Assignee: Nicholas Barker Design LLC, Laguna Beach, CA (US)

( * ) Notice: Subject to any disclaimer, the term of this patent is extended or adjusted under 35 U.S.C. 154(b) by 50 days.

(21) Appl. No.: 14/030,045

(22) Filed: Sep. 18, 2013

(51) Int. Cl.
*H04M 1/00* (2006.01)
*H04M 1/215* (2006.01)

(52) U.S. Cl.
CPC .................... *H04M 1/2155* (2013.01)

(58) Field of Classification Search
CPC ............ H04M 1/6066; H04M 1/6041; H04M 2250/02
USPC .......................... 455/569.1, 575.1, 550.1, 90.3
See application file for complete search history.

(56) References Cited

U.S. PATENT DOCUMENTS

| 5,832,079 | A | 11/1998 | Rabe |
| 8,428,665 | B1* | 4/2013 | McLaughlin et al. ..... 455/575.1 |
| 8,522,917 | B1 | 9/2013 | Oh |
| 2002/0009195 | A1 | 1/2002 | Schon |
| 2005/0085276 | A1* | 4/2005 | Yamaguchi et al. ........ 455/569.1 |
| 2006/0198534 | A1* | 9/2006 | Conrad ............................ 381/82 |
| 2010/0219012 | A1* | 9/2010 | Baumbach .................... 181/177 |
| 2013/0170686 | A1 | 7/2013 | Lester |

* cited by examiner

*Primary Examiner* — Nghi H Ly
(74) *Attorney, Agent, or Firm* — Boris Leschinsky

(57) ABSTRACT

A two-way passive acoustic concentrator for a mobile phone is generally horn-shaped with a narrow throat portion divided into a speaker horn chamber and a microphone horn chamber. The mobile phone is retained in a way to acoustically couple its speaker and microphone to the respective chamber of the acoustic concentrator. As a result, speaker sound amplification as well as sound concentration for the microphone can be achieved to provide a hands-free two-way speaker operation of the mobile phone.

3 Claims, 8 Drawing Sheets

TWO-WAY PASSIVE ACOUSTIC CONCENTRATOR FOR A MOBILE PHONE

BACKGROUND OF THE INVENTION

The present invention generally relates to audio amplification and in particular to accessories for coupling of acoustic energy into and out of electronic devices. More specifically, the invention describes a horn-shaped passive acoustic concentrator coupled to active acoustic transducers of the mobile phone (such as a built-in speaker and an internal microphone) to enhance the electroacoustic operation of such mobile phone.

Mobile phones and media devices provide many functions, such as a mobile phone capability, email device capability, web browser capability, and music/video player capability, for example. Mobile phones generally have a built-in speaker to produce sound that can be heard by a user of the device as well as a microphone. The speaker of these devices can provide sound output for a variety of purposes, such as a phone conversation, listening to music, news, and radio, for example.

Traditional speakers embedded within mobile phones often fail to provide adequate sound quality and volume, and they typically direct sound in a manner inconsistent with the goal of providing maximal audio power transmission to the user of the phone. These deficiencies generally have not been addressed by the prior art.

Earphones, earbuds, or other separate accessory speaker systems, are sometimes used to provide sound superior to speakers incorporated within the mobile phone. However, each of these alternatives have significant drawbacks. Earphones or earbuds for example require insertion into a user's ears, which may be undesirable. They also do not allow multiple listeners to share the sound from the mobile phone.

Known in the prior art are various passive horn-shaped attachments designed to amplify sounds emanated from the internal speaker of the mobile phone. Examples of such devices are shown and described for example in US Patent Application Publications Nos. 2010/0219012 and 2013/0170686 incorporated herein in their respective entireties by reference. Although these devices may improve the sound quality coming from the mobile phone, they are still limited in providing a full two-way enhancement for the user when the mobile phone is used in a two-way speaker mode.

There is a need for a passive acoustic concentrator to allow sound enhancement for both the sounds coming from the built-in speaker of the mobile phone as well as sounds received by the microphone of the mobile phone.

Additionally, the sound boosting devices of the prior art did not provide adequate support for the phone when placed therein—in such a way as to not obstruct user input area or a display of the phone itself. The need exists therefore for an acoustic concentrator which can serve also as a convenient and aesthetically pleasing stand for retention of the mobile phone—such to afford full user access to the display and user input buttons and enable viewing and operating the phone while attached to the acoustic concentrator itself.

SUMMARY OF THE INVENTION

Accordingly, it is an object of the present invention to overcome these and other drawbacks of the prior art by providing a novel two-way passive acoustic concentrator to enhance sound propagation from and to the mobile phone.

It is another object of the present invention to provide a two-way acoustic concentrator allowing hands-free operation of the mobile phone.

It is a further object of the present invention to provide an acoustic concentrator combined with a stand for placing the mobile device in position for unobstructed user operation while enhancing its sounds.

The two-way acoustic concentrator of the present invention is generally horn-shaped extending from a narrow throat portion to a wide bell section. Gradual flaring out and increase in the internal cross-section allows amplification of the sounds emanated by the speaker of the mobile phone. At the same time, the sound amplification effect works in the opposite way—to concentrate the sounds intended for the microphone of the mobile phone and therefore enhance a two-way hands-free communication performance of the mobile phone. To propagate the sounds appropriately, the throat section may be divided into a speaker horn chamber and a microphone horn chamber—in a way that the phone's microphone is acoustically coupled to the microphone horn chamber and the phone's speaker is acoustically coupled to the speaker horn chamber. As the horn expands towards the wide bell section, both chambers are combined to provide the wide bell benefits of sound amplification and concentration to both the speaker and the microphone of the mobile phone.

The acoustic concentrator of the present invention may also be equipped with a stand portion configured to retain the mobile phone in a generally up-right position and present it to the user for convenient operation and observation of its display.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION OF THE PREFERRED EMBODIMENT OF THE INVENTION

The following description sets forth various examples along with specific details to provide a thorough understanding of claimed subject matter. It will be understood by those skilled in the art, however, that claimed subject matter may be practiced without one or more of the specific details disclosed herein. Further, in some circumstances, well-known methods, procedures, systems, components and/or circuits have not been described in detail in order to avoid unnecessarily obscuring claimed subject matter. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

The term "mobile phone" is used here to include cellular phones, smart phones, tablets, and other mobile electronic devices which have at least one built-in speaker and at least one built-in microphone. The mobile phone 10 is generally shown in FIGS. 1-13 using broken lines as it forms no part of the claimed design of the acoustic concentrator.

Figure 1:
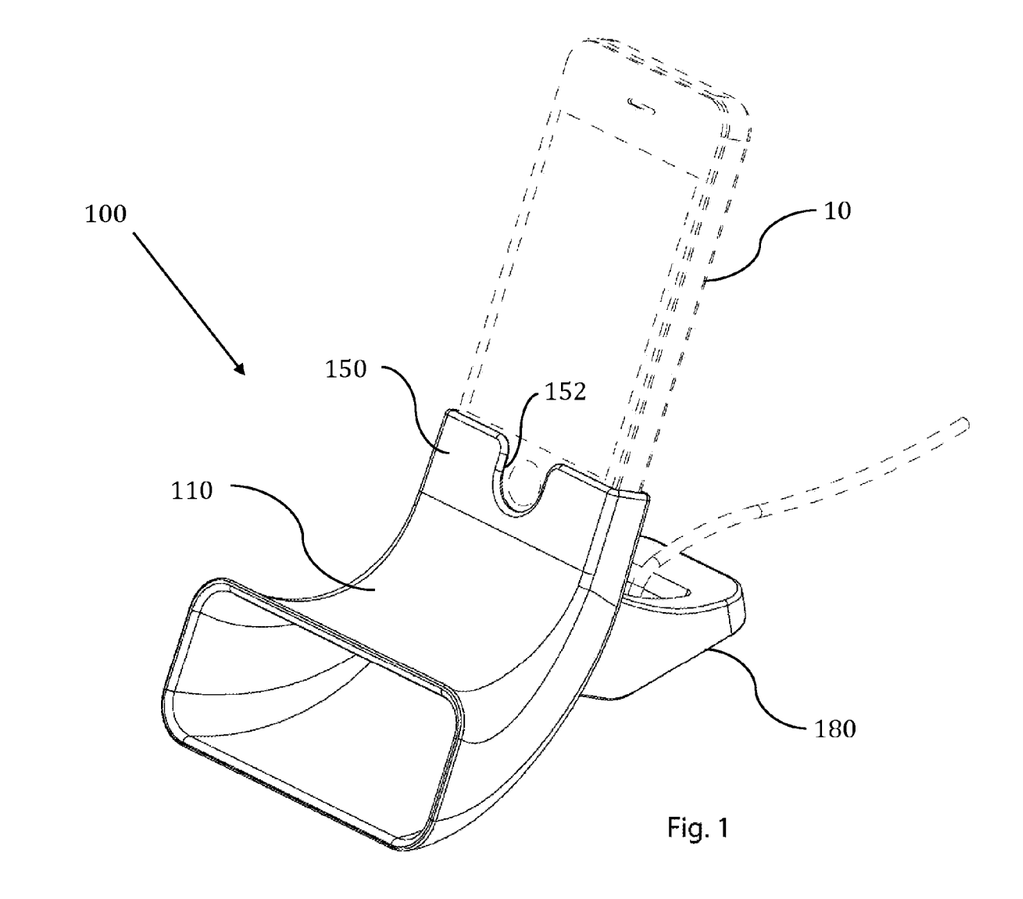
FIG. 1 is a general three-quarter side view of the acoustic concentrator with a mobile phone placed thereon.
Figures 2, 3:
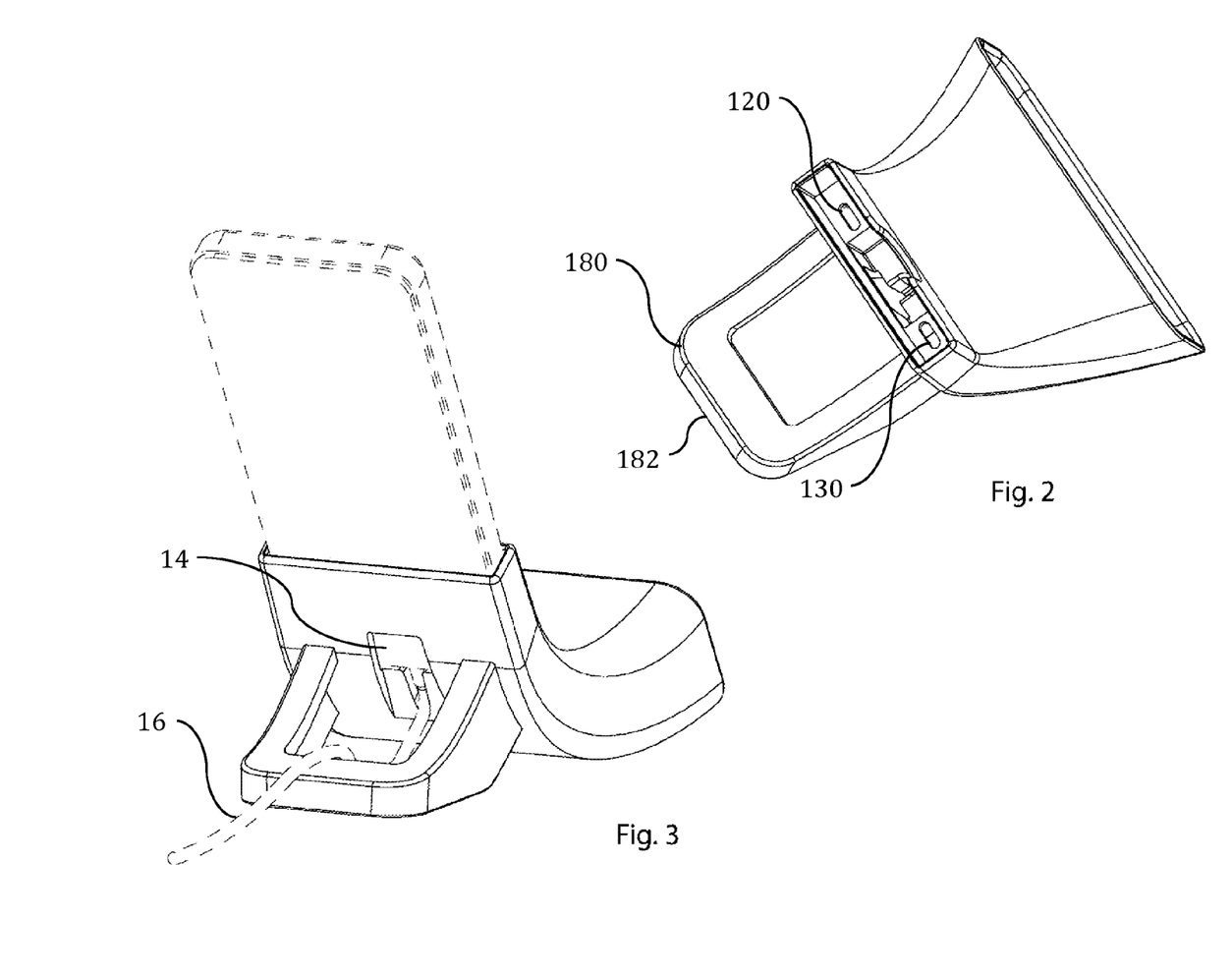
FIG. 2 is a general three-quarter top view of the acoustic concentrator.
FIG. 3 is a general three-quarter back view of the acoustic concentrator.

Starting on FIG. 1, there is shown a two-way acoustic concentrator 100 in combination with the mobile phone 10. The acoustic concentrator 100 generally includes a phone retention portion 150, a sound amplification portion 110, and a stand portion 180 to keep the phone 10 in a generally up-right position.

The phone retention portion 150 may be generally shaped to partially encase and retain the phone 10 when placed therein. Specific shape of the phone retention portion 150 may differ depending on the shape of the mobile phone 10. For the purposes of this description and just as an illustration, the mobile phone 10 is shown as iPhone. In this case, a cutout 152 may be provided to allow full access of the user to the buttons and screens of the mobile phone 10. The height if the side walls of the phone retention portion 150 may be selected to allow sufficient retention and steady positioning of the mobile phone 10 when placed therein—all without compromising the ease of removal from the acoustic concentrator 100.

The phone retention portion 150 may also be shaped to contain two openings: a speaker opening 120 located next to the phone's speaker, and the microphone opening 130 located next to the phone's speaker. In case of the iPhone, the speaker opening 120 may be a rectangular cutout of about ⅓" by about ⅛". The term "about" is used throughout this description as a +/−50% of the respective following number. The microphone opening 130 may be sized as a rectangular cutout of about ⅓" by about ⅛".

The phone retention portion 150 may also contain design features aimed at preventing accidental removal or fallout of the mobile phone 10 from the acoustic concentrator 100, such as rubber bumpers or felt pads for example (not shown).

In embodiments, the phone retention portion 150 may be made integral with (as shown) or detachable from the sound amplification portion 110 (not shown). Making the phone retention portion 150 detachable from the sound amplification portion 110 may be done for the purposes of accommodating another phone on the acoustic concentrator 100. In this case, each of the several detachable phone retention portions 150 may be shaped differently to match the location of the speakers and microphones of respective models of the mobile phone 10. At the same time, all such phone retention portions 150 may be made to have the same design of the interface with the sound amplification portion 110 so as to assure suitable sound propagation.

In alternate embodiments, the phone retention portion 150 may include a clip, a case or other known retention elements such that the speaker and microphone openings are aligned respectively with the phone's speaker and microphone.

Figure 4:
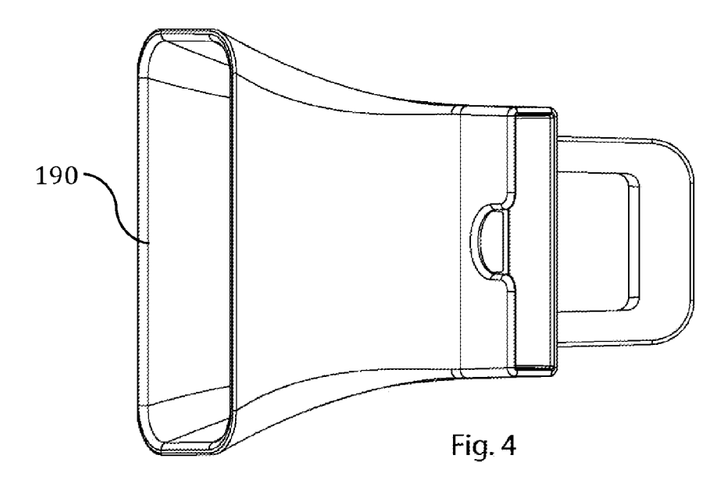
FIG. 4 is a general top view with the acoustic concentrator placed on its side, such as to make it advantageous to view the mobile phone in landscape orientation, for example when watching movies.
Figure 5:
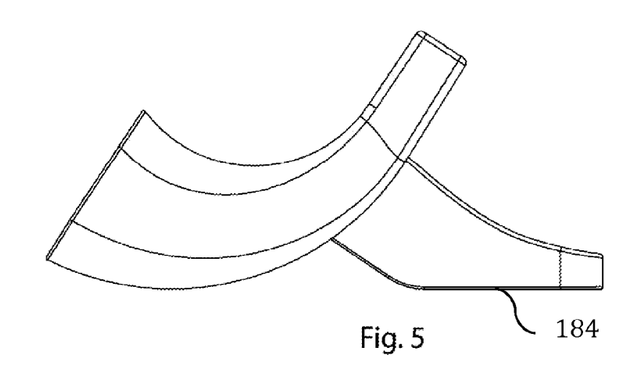
FIG. 5 is a side view of the acoustic concentrator from the left.
Figure 6:
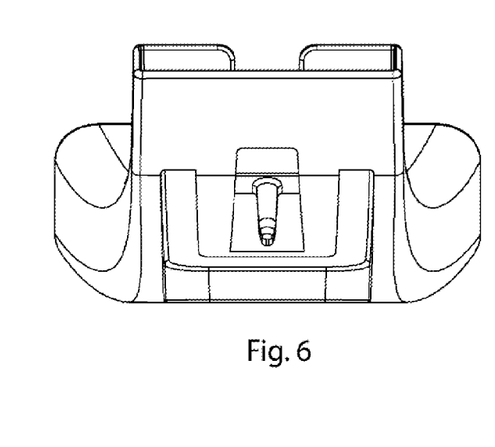
FIG. 6 is a back view of the acoustic concentrator.
Figure 7:
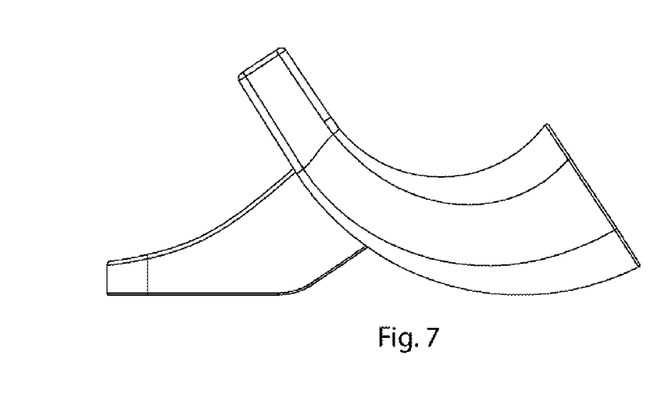
FIG. 7 is a side view of the acoustic concentrator from the right.
Figure 8:
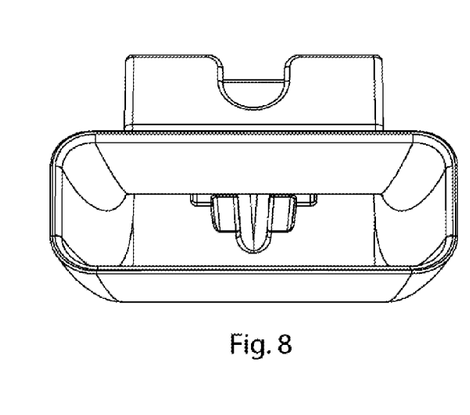
FIG. 8 is a front view of the acoustic concentrator.
Figure 9:
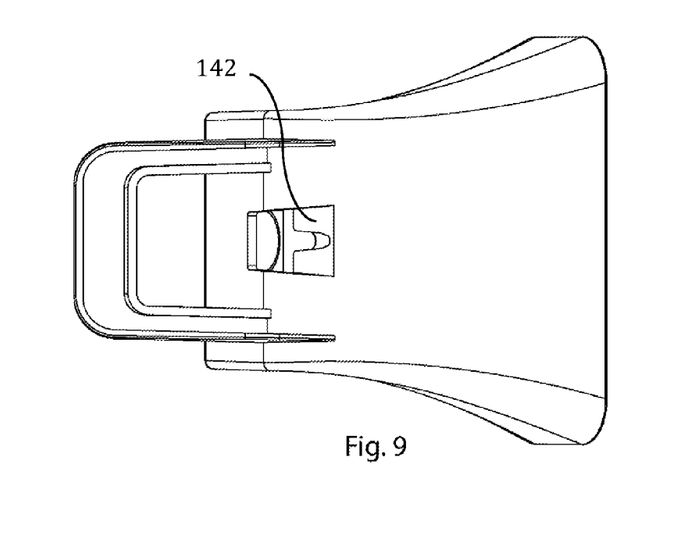
FIG. 9 is a bottom view of the acoustic concentrator.
Figure 10:
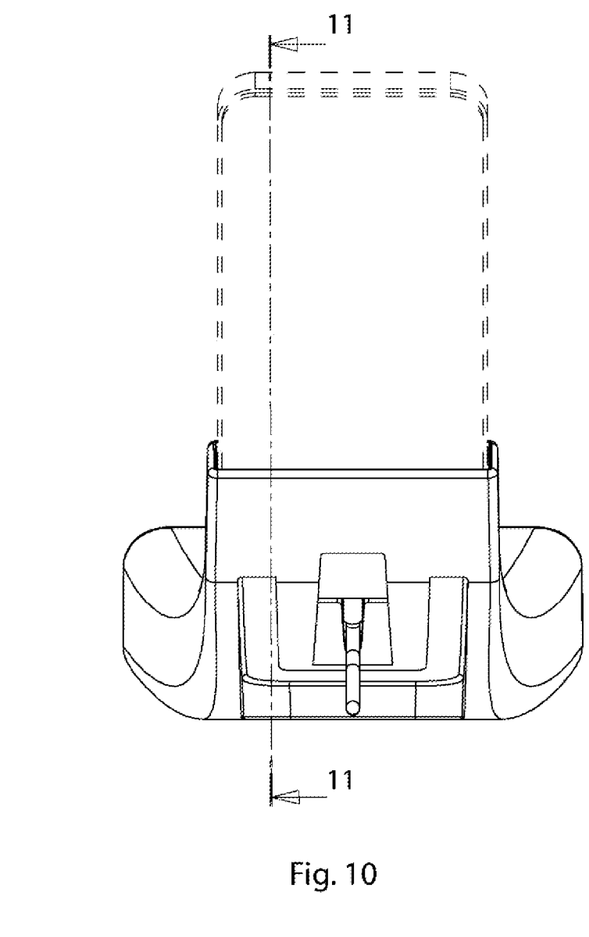
FIG. 10 is a back view of the acoustic concentrator and the mobile phone placed thereon.
Figures 14, 15:
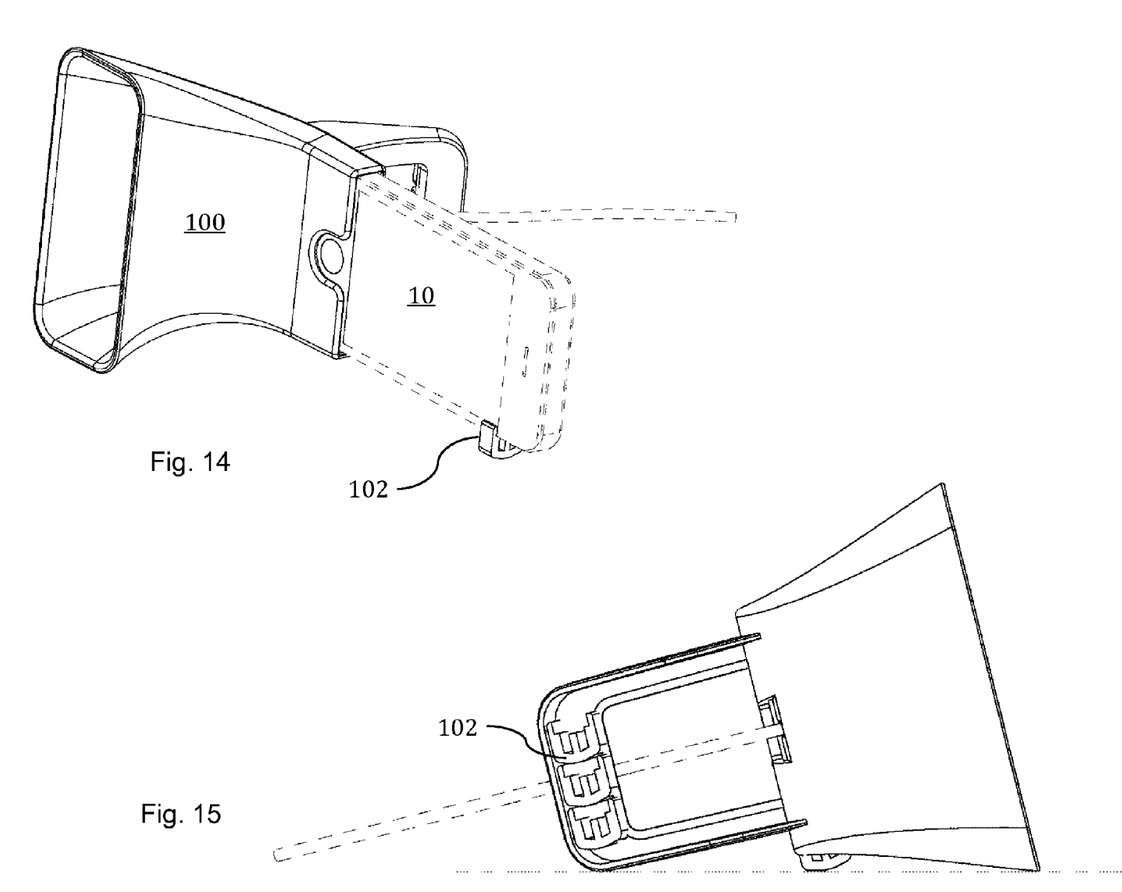
FIG. 14 is a three-quarters view of the alternative configuration of the acoustic concentrator in which an additional clip is provided to retain the mobile phone in a horizontal position for viewing a display thereof in a landscape mode.
FIG. 15 is a back view of the same showing the details of storing the clips inside the stand portion of the device.
Figure 16:
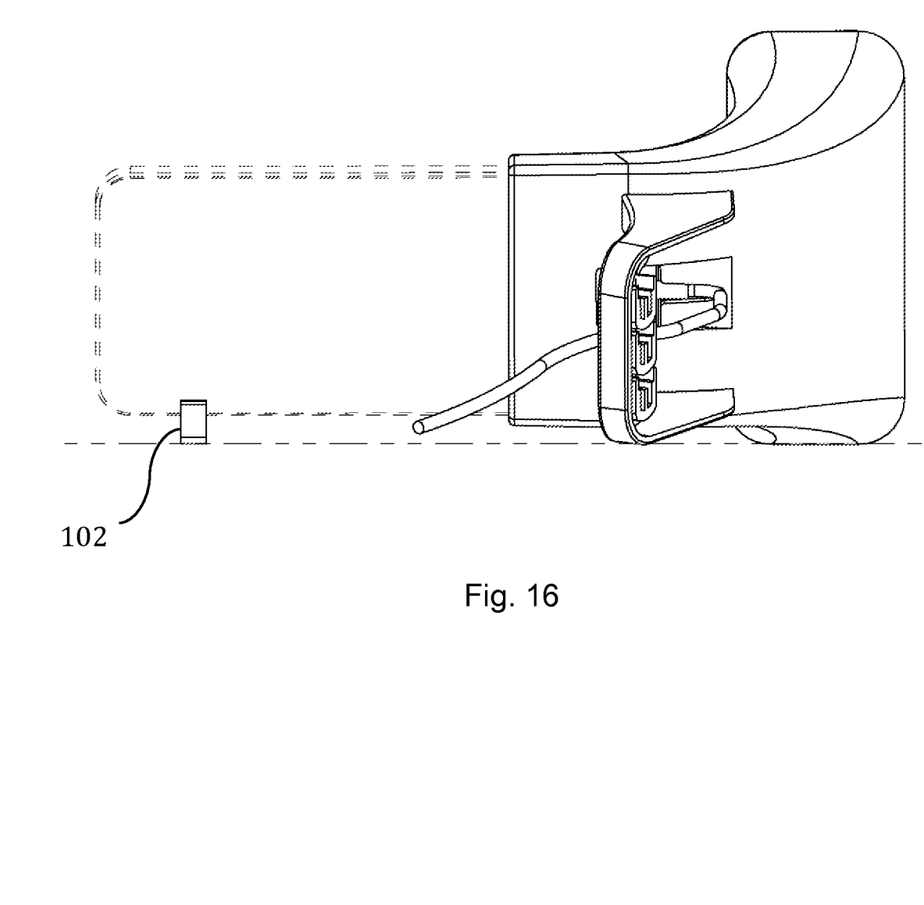
FIG. 16 is a back view thereof when the phone is retained by the device showing the position of the clip.

The acoustic concentrator 100 may be configured to allow a convenient way to view and operate the mobile phone 10 in both a vertical (portrait) and horizontal (landscape) configurations. FIG. 4 for example shows the device positioned on its side for this purpose. The mobile phone 10 may be retained in the device 100 in this case for landscape mode of viewing as seen in FIGS. 14-16—for example when watching movies. To assure that the mobile phone 10 is not tilted down at the side which is away from the acoustic concentrator 100, an additional clip 102 may be provided in a kit with the acoustic concentrator 100 to serve as a suitable spacer to support the mobile phone 10 in a horizontal orientation—see FIGS. 14-16. One or more clips 102 may be stored within the acoustic concentrator 100, for example such clips 102 may be detachably retained in the stand portion 180 as seen in FIG. 15.

Alternatively, a detachable or foldable extension arm may be provided for the same purpose. The arm in this case may be operated to extend from one side of the retention portion 150 along the side of the mobile phone 10 through at least the point of the center of gravity of the mobile phone 10 in combination with the acoustic concentrator 100.

The sound amplification portion 110 may be generally shaped as a horn with a narrow throat portion 140 gradually flaring out to a wide bell section 190. Acoustic horns are generally known to amplify sounds. They are generally designed to match the acoustical impedance of the acoustic transducer such as a speaker or a microphone to the impedance of ambient air. Acoustical impedance is the ratio of sound pressure to volume velocity of air. In a horn, the acoustical impedance will increase when the cross-section of the horn decreases, as a decrease in cross section will limit the flow of air at a certain pressure. For a given speaker or a microphone, moving sound waves experience an abrupt change in impedance when transitioning from ambient air to the respective acoustic transducer. A gradually expanding horn can smooth out this transition as well as direct sound towards the user and therefore may reduce acoustic losses as well as improve sound quality and volume. In addition to amplifying sounds emanated by the speaker, the horn may be used in the opposite direction—to concentrate the sounds on the receiving microphone.

Figures 12, 13:
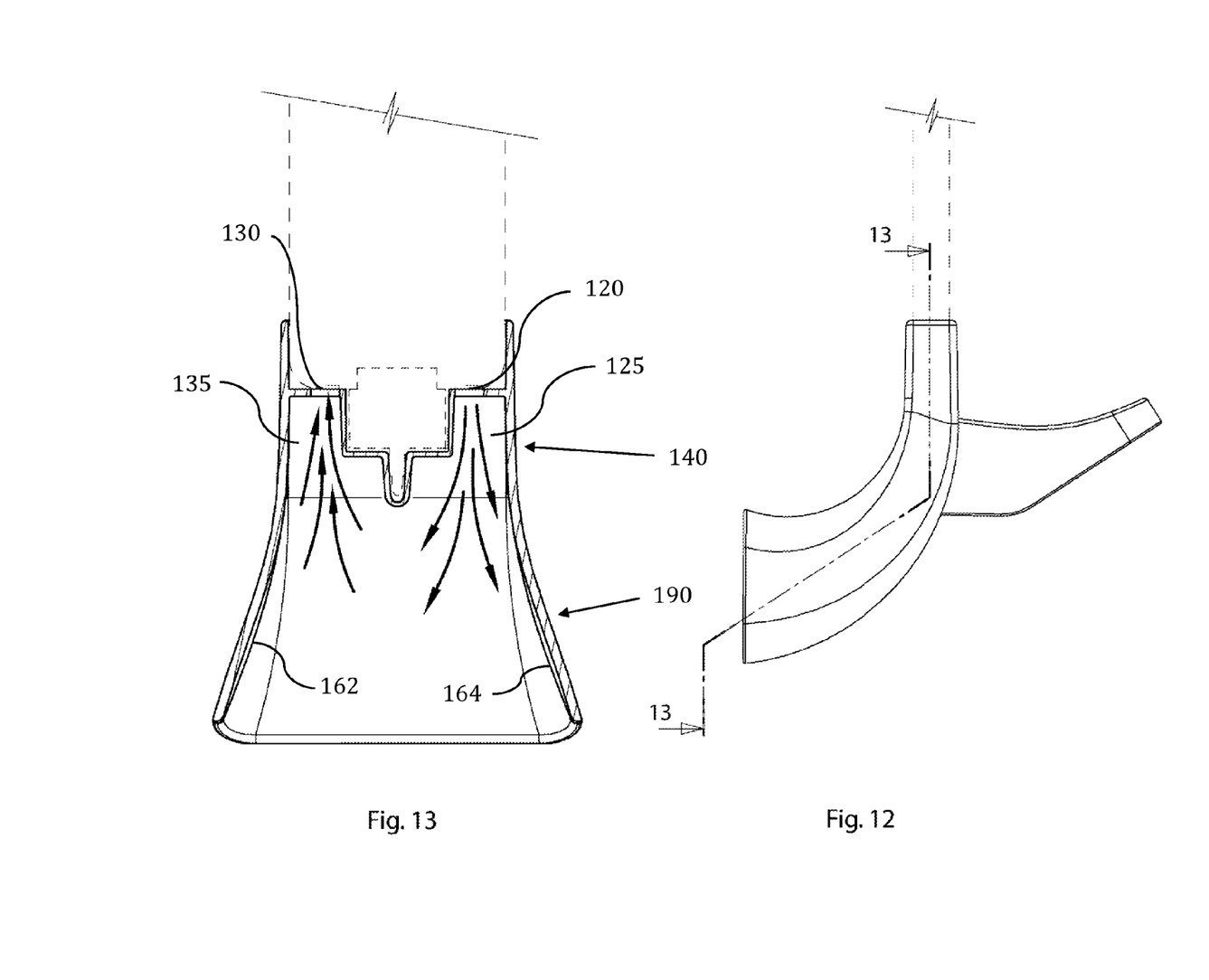
FIG. 12 is a side view of the acoustic concentrator showing a line of view 13-13.
FIG. 13 is a cross-sectional view of the acoustic concentrator along the line 13-13 in FIG. 12.

In embodiments, the narrow throat portion 140 of the sound amplification portion 110 may be divided into a speaker horn chamber 125 positioned to extend from the speaker opening 120 and a microphone horn chamber 135 extending from the microphone opening 130—see FIG. 13. The degree of separation between the two chambers 125 and 135 may be defined by the space between the phone's speaker and the microphone, which may vary between different models and makes of the mobile phone 10. Another consideration for the design of the chambers is the presence of various electrical connectors in the area adjacent the speaker or the microphone. In iPhone for example, there is present an electrical cable 16 extending from an electrical connector 14. The sound amplification portion 110 may have an appropriately sized cutout with an externally facing cavity 142 sized to envelope the connector 12 and allow some room for the electrical cable 16 to be routed away from the acoustic concentrator 100.

When stretched on a straight line, the horn-shaped sound amplification portion 110 may be about 4" long and the two chambers 125 and 135 in the narrow throat portion may gradually flare out to a single wide bell 190, which may be sized to be a rectangle of about 1.6" by about 3.9".

The expansion rate of the cross-sectional area of the horn is critical for its best performance. Traditional acoustic horns may be shaped to have an exponential expansion rate. The shape of the horn of the present invention, however, is designed to accommodate the separate locations of the speaker and the microphone in the mobile phone 10. To preserve the broadest range of the sound transmission frequencies, it was determined that the first expansion rate of the cross-sectional area in the narrow throat portion 140 should be minimized, such as for example not to exceed 10% of the starting cross-sectional area at a location next to the speaker opening 120 and the microphone opening 130. Stated differently, the internal walls 162 and 164 (FIG. 13) are close to being parallel in the narrow throat portion 140. The shape in this portion may be selected to be conical.

In the wide bell section 190 however, the internal walls 162 and 164 may flare out with a second expansion rate, which may be selected to be greater than a first expansion rate. The second expansion rate may be selected to be conical, exponential, parabolic, or hyperbolic in some embodiments. The embodiment shown in the figures, for example, has a hyperbolic expansion rate at the wide bell section 190.

Figure 11:
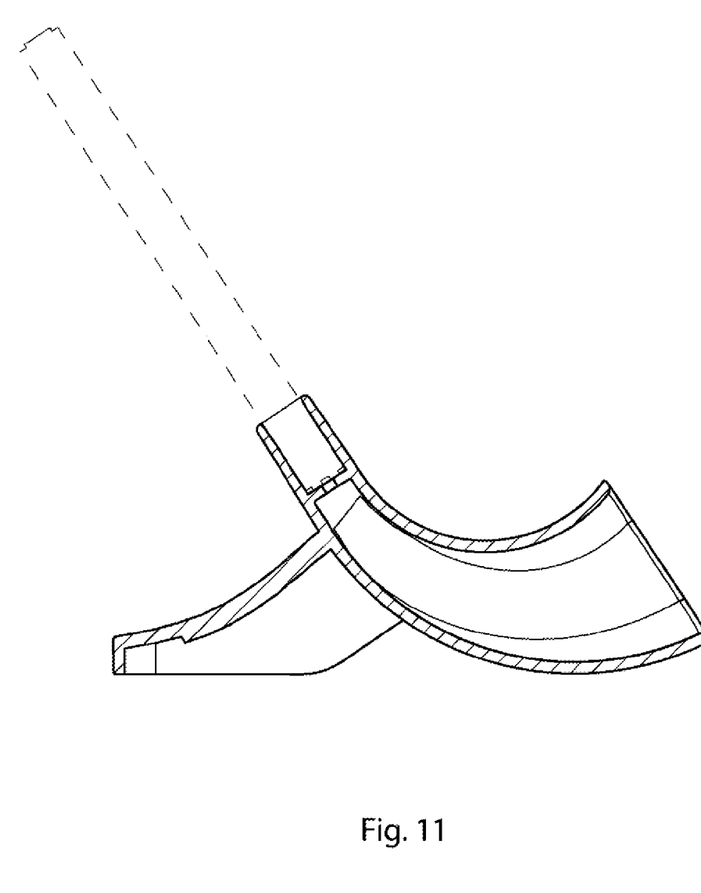
FIG. 11 is a cross-sectional view of the acoustic concentrator along the line 11-11 in FIG. 10.

The expansion rate of the horn may be the same or different in a horizontal direction (FIG. 13) as compared to the vertical direction (FIG. 11). In some embodiments, if the horn were laid flat, the rate of vertical expansion may be linear (conical horn), while the rate of horizontal expansion may be exponential or hyperbolic. Curved horns may improve the dynamic range of the sound coming from the speaker as well as sounds received by the microphone of the mobile phone 10.

Larger horns may be able to provide better sound amplification and transmit full range of dynamic frequency—at the expense of large size and inconvenience in handling. A typical speaker in a small mobile phone 10 has inherent limitations in its dynamic frequency range, which cannot be compensated by simply increasing the size of the horn. Given these considerations, cited above dimensions of the acoustic concentrator of the invention represent a balanced approach aimed to improve sound performance while minimizing the size of the device.

The stand portion 180 may be provided in the back of the device to support the mobile phone 10 in a generally upright position. In embodiments, the stand portion 180 may include a wide foot 182 (FIG. 2) sized to assure stable retention of the mobile phone 10 when the user operates (depresses) the buttons or touches the screen of the phone. To further improve stability and obviate the need to take the mobile phone off the acoustic concentrator 100 (for example to change the music or to start another video), the stand portion 180 may have an extended horizontal portion 184 aligned with the lower edge of the wide bell portion 190.

The acoustic concentrator 100 may be made from a variety of rigid or semi-rigid materials. Polymers such as Acrylic, Acronitrile Butadiene Styrene (ABS), Polycarbonate, Polycarbonate ABS Blend, Polyethylene, Polypropylene, Polyvinyl Chloride, Thermoplastic Elastomer, Themoplastic Polyurethane may be suitably used as a material of choice. In embodiments, the entire device may be made from the same material as one piece. A family of different colors acoustic concentrators may be offered for sale to improve esthetic value for the product. In embodiments, the device 100 may be made translucent or transparent.

As opposed to energized sound amplification systems, a passive acoustic concentrator of the invention has a number of inherent advantages as follows:

Does not require its own energy supply, does not deplete a battery—environmentally friendly Does not electronically interfere with the mobile phone itself, no "positive feedback" sound distortions The phone can be charged while placed onto the acoustic concentrator There are no moving or electronic parts—device is inherently reliable Low production cost May be formed in a variety of colors and esthetically pleasing shapes In embodiments, the acoustic concentrator may be built together with a phone charger as a single unit. In other embodiments, the acoustic concentrator may be built into a dashboard of a vehicle to provide a cradle for placing the mobile phone when riding in the vehicle. In some embodiments, the acoustic concentrator of the invention may enhance or replace a ubiquitous Bluetooth connection between the car radio and speaker system and the mobile phone for safe hands-free operation of the phone.

The present invention also describes a novel method for providing a sounds amplification effect for a mobile phone. The novel method may include the following steps:

a) providing a two-way passive acoustic concentrator with a sound amplification portion formed as a horn having a narrow throat section gradually flaring out into a wide bell section. The narrow throat section may be divided into a speaker horn chamber extending from said speaker opening and a microphone horn chamber extending from said microphone opening, b) acoustically coupling a speaker of said mobile phone to said speaker horn chamber, such as for example by placing the mobile phone in close proximity to the speaker opening, c) acoustically coupling a microphone of said mobile phone to said microphone horn chamber, for example by placing the microphone in close proximity to the microphone opening, and d) operating at least one of the speaker or the microphone, whereby the passive acoustic concentrator of the invention providing the desired sounds amplification effect for sounds emanating from the speaker or sounds received by the microphone.

The herein described subject matter sometimes illustrates different components or elements contained within, or connected with, different other components or elements. It is to be understood that such depicted architectures are merely examples, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Although the invention herein has been described with respect to particular embodiments, it is understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A method for providing a two-way sound amplification effect for a mobile phone, the method comprising the following steps:

a) providing a two-way passive acoustic concentrator with a sound amplification portion formed as a horn having a narrow throat section gradually flaring out into a wide bell section, said narrow throat section is divided into a speaker horn chamber extending from said speaker opening and a microphone horn chamber extending from said microphone opening, said microphone horn chamber is spaced apart from said speaker horn chamber with a divider therebetween so as to reduce interference of sounds propagating to and from said microphone opening and said speaker opening, said divider not extending into said wide bell section of said horn, b) acoustically coupling a speaker of said mobile phone to said speaker horn chamber, whereby sounds emanating from said speaker are directed to substantially propagate through said speaker horn chamber apart from said microphone horn chamber, towards and out of said wide bell section of said horn after amplification therein, c) acoustically coupling a microphone of said mobile phone to said microphone horn chamber, whereby sounds entering said wide bell section of said horn are amplified therein before entering said microphone horn chamber spaced apart from said speaker horn chamber and propagated towards said microphone of said mobile phone, whereby said horn is configured for co-existence of incoming sounds and outgoing sounds within said undivided wide bell section thereof, said narrow throat section is configured to separate said microphone and speaker sounds to reduce interference therebetween, and d) operating at least one of said speaker or said microphone, whereby said passive acoustic concentrator providing said two-way sound amplification effect for propagating sounds emanating either from said speaker or sounds received by said microphone.

2. The method as in claim 1 further including a step of operating both said speaker and said microphone, whereby said passive acoustic concentrator providing a two-way speaker effect for said mobile phone acoustically coupled thereto.

3. A two-way passive acoustic concentrator for a mobile phone, the acoustic concentrator comprising:

a phone retention portion configured to releasably retain said mobile phone therein, the phone retention portion including a speaker opening adjacent to a speaker of said mobile phone and a microphone opening adjacent to a microphone of said mobile phone when said mobile phone is placed in said phone retention portion, said microphone opening is spaced apart from said speaker opening, and a sound amplification portion formed as a horn having a narrow throat section gradually flaring out into a wide bell section, said narrow throat section is divided into:

a speaker horn chamber extending from said speaker opening and a microphone horn chamber extending from said microphone opening, said microphone horn chamber is spaced apart from said speaker horn chamber with a divider therebetween so as to reduce interference of sounds propagating to and from said microphone opening and said speaker opening, said divider not extending into said wide bell section of said horn, whereby combining said speaker horn chamber with said microphone horn chamber into a single undivided wide bell section inside said sound amplification portion causing co-existence of incoming sounds and outgoing sounds within said wide bell section and a two-way sound amplification effect for either outgoing sounds emanated by said speaker or incoming sounds received by said microphone.

* * * * *